(12) United States Patent
Lin et al.

(10) Patent No.: US 11,500,274 B2
(45) Date of Patent: Nov. 15, 2022

(54) PROJECTOR

(71) Applicant: Coretronic Corporation, Hsin-Chu (TW)

(72) Inventors: Tsung-Ching Lin, Hsin-Chu (TW); Wei-Chi Liu, Hsin-Chu (TW); Jhih-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/482,435

(22) Filed: Sep. 23, 2021

(65) Prior Publication Data
US 2022/0100066 A1 Mar. 31, 2022

(30) Foreign Application Priority Data
Sep. 30, 2020 (CN) .......................... 202022204093.3

(51) Int. Cl.
*G03B 21/16* (2006.01)
*G03B 21/14* (2006.01)

(52) U.S. Cl.
CPC ........... *G03B 21/16* (2013.01); *G03B 21/145* (2013.01)

(58) Field of Classification Search
CPC .............................. G03B 21/16; G03B 21/145

USPC .......................................................... 353/61
See application file for complete search history.

(56) References Cited

U.S. PATENT DOCUMENTS

| | | | |
|---|---|---|---|
| 2004/0190261 | A1 | 9/2004 | Lopatinsky et al. |
| 2011/0157560 | A1* | 6/2011 | Hsiao ..................... G03B 21/16 353/58 |

FOREIGN PATENT DOCUMENTS

| | | |
|---|---|---|
| TW | I328997 | 8/2010 |
| TW | I417635 | 12/2013 |
| TW | I581048 | 5/2017 |

\* cited by examiner

*Primary Examiner* — Jerry L Brooks
(74) *Attorney, Agent, or Firm* — JCIPRNET

(57) ABSTRACT

A projector includes a housing, a fan, a first heat dissipation fin group, a second heat dissipation fin group, and at least one heat generation assembly. The housing includes a first air entry, a second air entry, and a first air exit. The fan, the first and second heat dissipation fin groups, and the heat generation assembly are disposed in the housing. The fan is located between the first and second heat dissipation fin groups. The fan includes a first air inlet, a second air inlet, and an air outlet disposed corresponding to the first air exit. The first heat dissipation fin group is located between the first air entry and the first air inlet. The second heat dissipation fin group is located between the second air entry and the second air inlet. The heat generation assembly is connected to the first and second heat dissipation fin groups.

20 Claims, 8 Drawing Sheets

PROJECTOR

CROSS-REFERENCE TO RELATED APPLICATION

This application claims the priority benefit of China application serial no. 202022204093.3, filed on Sep. 30, 2020. The entirety of the above-mentioned patent application is hereby incorporated by reference herein and made a part of this specification.

BACKGROUND

Technical Field

The disclosure relates to a projector, and in particular, relates to a projector providing favorable heat dissipation efficiency.

Description of Related Art

At present, in a solid-state light source projection system, a heat dissipation module made of high thermal conductivity materials is usually used most of the time to dissipate heat from the heat source (e.g., LED and LD light sources). Generally, the housing of a projector has one air entry and one air exit at the left and right sides. Two axial fans are individually located at the air entry and the air exit, and the heat pipe and the heat dissipation fin are located between the fan located at the air entry and heat source. The heat source in the projector is connected to the heat dissipation fin through the heat pipe, and cold air is introduced by the fan at the air entry to perform heat dissipation on the heat dissipation fin. The heated air then passes through the heat source and moves downstream (i.e., the direction of the air exit) to cool other components. With the evolution of products and improvement of living standards, users' demand for high-brightness display products rises. Nevertheless, display products exhibiting higher brightness generate more heat. The temperature of the air may thereby increase when the air passes through the heat source after cooling the heat dissipation fin. When the high-temperature air moves downstream, the air not only fails to cool down the downstream components but also heats up other components, leading to decreased service life of the components as a result. In addition, an axial fan has low static pressure resistance, so the fan is required to provide a high speed or thick thickness to make up for the lack of system flow. The disadvantage of increased system noise inevitably occurs.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the disclosure was acknowledged by a person of ordinary skill in the art.

SUMMARY

The disclosure provides a projector exhibiting favorable heat dissipation efficiency.

To achieve one, part of, or all of the objectives aforementioned or other objectives, an embodiment of the disclosure provides a projector including a housing, a fan, a first heat dissipation fin group, a second heat dissipation fin group, and at least one heat generation assembly. The housing includes a first air entry, a second air entry, and a first air exit. The fan, the first heat dissipation fin group, the second heat dissipation fin group, and the heat generation assembly are disposed in the housing. The fan is located between the first heat dissipation fin group and the second heat dissipation fin group. The fan includes a first air inlet, a second air inlet, and an air outlet, and the air outlet is disposed corresponding to the first air exit of the housing. The first heat dissipation fin group is located between the first air entry and the first air inlet. The second heat dissipation fin group is located between the second air entry and the second air inlet. The heat generation assembly is connected to the first heat dissipation fin group and the second heat dissipation fin group.

To sum up, the embodiments of the disclosure have at least one of the following advantages or effects. In the projector provided by the disclosure, the fan is located between the first heat dissipation fin group and the second heat dissipation fin group. The first heat dissipation fin group is located between the first air entry of the housing and the first air inlet of the fan, the second heat dissipation fin group is located between the second air entry of the housing and the second air inlet of the fan, and the heat generation assembly is connected to the first heat dissipation fin group and the second heat dissipation fin group. Accordingly, as the fan allows air to enter from two sides, cold air may directly pass through the first heat dissipation fin group and the second heat dissipation fin group, and the heated air is then directly discharged from the air outlet of the fan. In this way, heat dissipation is performed on the heat generation assembly, the heated air may also be prevented from directly heating the downstream components, and that the projector may therefore provide favorable heat dissipation efficiency.

Other objectives, features and advantages of the present disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings.

Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
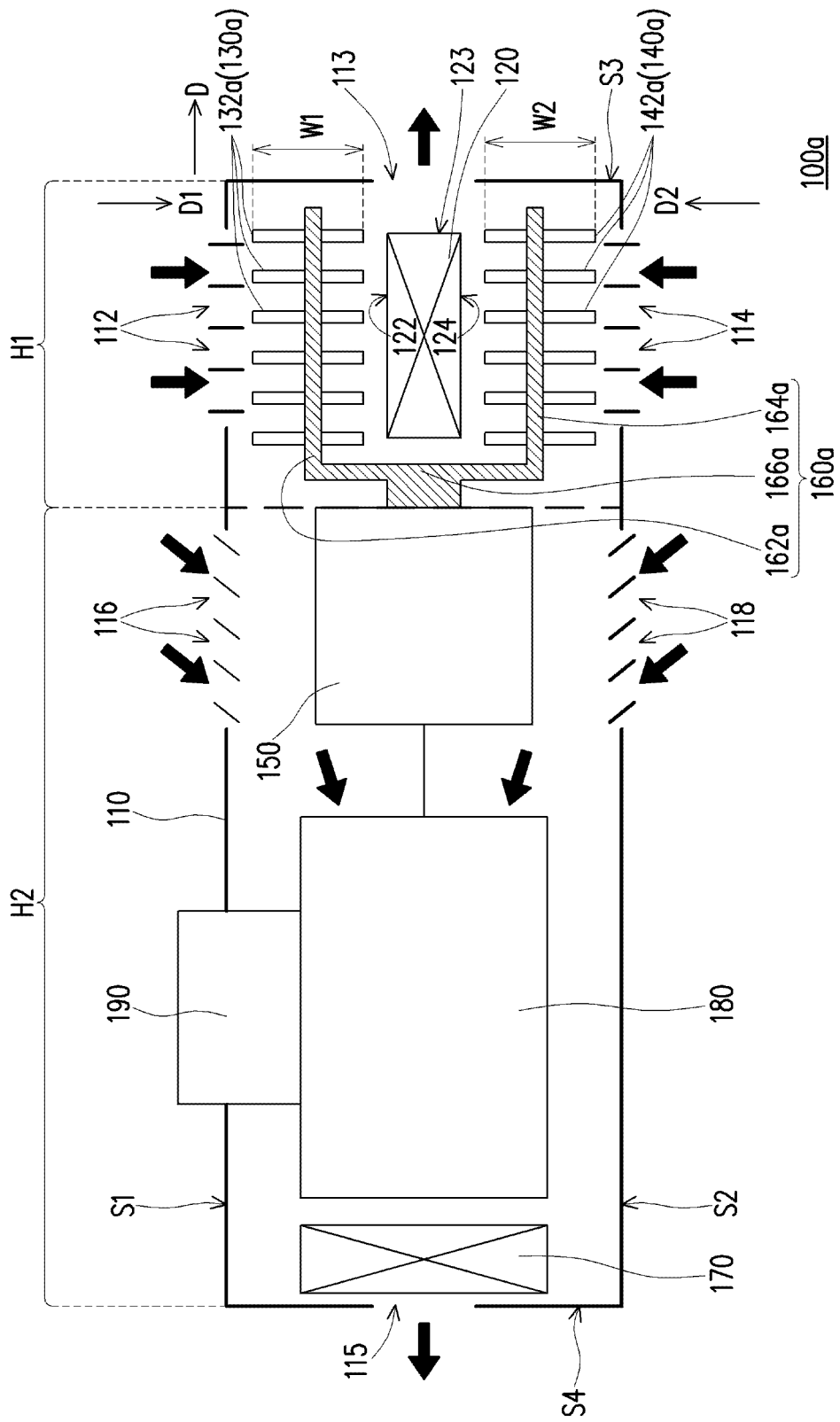
FIG. 1 is a schematic view of a projector according to an embodiment of the disclosure.

FIG. 1 is a schematic view of a projector according to an embodiment of the disclosure. With reference to FIG. 1, in this embodiment, a projector 100a includes a housing 110, a fan 120, a first heat dissipation fin group 130a, a second heat dissipation fin group 140a, and at least one heat generation assembly 150. Herein, the projector 100a is, for example, a projector adopting a solid-state light source (e.g., a light emitting diode (LED) and a laser diode (LD) and the like, and the heat generation assembly 150 is, but not limited to, the above-mentioned solid-state light source.

To be specific, in this embodiment, the housing 10 includes a first air entry 112, a second air entry 114, and a first air exit 113. The fan 120, the first heat dissipation fin group 130a, the second heat dissipation fin group 140a, and the heat generation assembly 150 are disposed in the housing 110. The fan 120 is, for example, a blower fan and is located between the first heat dissipation fin group 130a and the second heat dissipation fin group 140a. The fan 120 includes a first air inlet 122, a second air inlet 124, and an air outlet 123, and the air outlet 123 of the fan 120 is disposed corresponding to the first air exit 113 of the housing 110. The first heat dissipation fin group 130a is located between the first air entry 112 of the housing 110 and the first air inlet 122 of the fan 120, and the second heat dissipation fin group 140a is located between the second air entry 114 of the housing 110 and the second air inlet 124 of the fan 120. The heat generation assembly 150 is connected to the first heat dissipation fin group 130a and the second heat dissipation fin group 140a.

Further, the housing 110 provided by this embodiment may be divided into a first heat dissipation region H1 and a second heat dissipation region H2. The heat generation assembly 150 is located in the second heat dissipation region H2, and the first heat dissipation fin group 130a, the second heat dissipation fin group 140a, and the fan 120 are located in the first heat dissipation region H1. The first air exit 113 of the housing 110 is disposed in the first heat dissipation region H1. Further, the housing 110 has a first side S1 and a second side S2 opposite to each other and a third side S3 and a fourth side S4 connected to the first side S1 and the second side S2 and opposite to each other. The housing 110 further includes a third air entry 116, a fourth air entry 118, and a second air exit 115. The third air entry 116, the fourth air entry 118, and the second air exit 115 are disposed in the second heat dissipation region H2. As shown in FIG. 1, the first air entry 112, the second air entry 114, and the first air exit 113 are disposed in the first heat dissipation region H1. The first air entry 112 and the third air entry 116 are located at the first side S1, and the second air entry 114 and the fourth air entry 118 are located at the second side S2. A first air entry direction D1 of the first air entry 112 is substantially perpendicular to the first side S1, and a second air entry direction D2 of the second air entry 114 is substantially perpendicular to the second side S2. An air entry direction of the third air entry 116 is substantially inclined with respect to the first side S1, and an air entry direction of the fourth air entry 118 is substantially inclined with respect to the second side S2. The first air exit 113 is located at the third side S3, and the second air exit 115 is located at the fourth side S4. Herein, the first air entry 112, the second air entry 114, the third air entry 116, and the fourth air entry 118 of the housing 110 are provided with a plurality of baffles (not shown) disposed at intervals, and the baffles are configured to guide air outside the housing 110 to enter into the housing 110 in directions guided by the baffles at the air entries. The direction guided by the baffles located at the first air entry 112 is the first air entry direction D1 of the first air entry 112. The direction guided by the baffles located at the second air entry 114 is the second air entry direction D2 of the second air entry 114. The direction guided by the baffles located at the third air entry 116 is the air entry direction of the third air entry 116. The direction guided by the baffles located at the fourth air entry 118 is the air entry direction of the fourth air entry 118. In the case that these baffles are perpendicular to a side wall of the housing, the air entry directions of the air entries may thus be perpendicular to the side wall of the housing. In the case that these baffles are inclined with respect to the side wall of the housing, the air entry directions of the air entries may thus be inclined with respect to the side wall of the housing.

Further, in this embodiment, the first heat dissipation fin group 130a includes a plurality of first heat dissipation fins 132a disposed at intervals, and the second heat dissipation fin group 140a includes a plurality of second heat dissipation fins 142a disposed at intervals. The first heat dissipation fins 132a and the second heat dissipation fins 142a are arranged at equal intervals or unequal intervals in an arrangement direction D. In particular, a first width W1 of each of the first heat dissipation fins 132a in the first air entry direction D1 of the first air entry 112 is less than or equal to 100 millimeters. A second width W2 of each of the second heat dissipation fins 142a in the second air entry direction D2 of the second air entry 114 is less than or equal to 100 millimeters. The first width W1 of each of the first heat dissipation fins 132a and the second width W2 of each of the second heat dissipation fins 142a may be identical or may be different, which is not particularly limited. Herein, the first air entry direction D1 of the first air entry 112 and the second air entry direction D2 of the second air entry 114 are respectively perpendicular to the arrangement direction D of the first heat dissipation fins 130a and the second heat dissipation fins 140a.

Further, the projector 100a provided by this embodiment further includes a heat pipe assembly 160a. The heat pipe assembly 160a is disposed in the first heat dissipation region H1 of the housing 110 and includes a first heat pipe portion 162a, a second heat pipe portion 164a, and a connection portion 166a. The first heat pipe portion 162a is connected to the first heat dissipation fins 132a and the connection portion 166a, and the second heat pipe portion 164a is connected to the second heat dissipation fins 142a and the connection portion 166a. Herein, a number of the at least one heat generation assembly 150 is one, and the connection portion 166a is connected to the heat generation assembly 150, the first heat pipe portion 162a, and the second heat pipe portion 164a. That is, the heat generation assembly 150 provided by this embodiment is connected to the first heat dissipation fin group 130a and the second heat dissipation fin group 140a through the heat pipe assembly 160a.

With reference to FIG. 1 again, the projector 100a provided by this embodiment further includes a system fan 170, and the system fan 170 is disposed in the second heat dissipation region H2 and is disposed corresponding to the second air exit 115 of the housing 110. Herein, the second air exit 115 is located at the fourth side S4, and the system fan 170 is, for example, an axial fan. In addition, the projector 100a provided by this embodiment further includes an optical engine module 180 and a projection lens 190. The optical engine module 180 and the projection lens 190 are disposed in the second heat dissipation region H2 of the housing 110, and the projection lens 190 is connected to the optical engine module 180 and extends outside the housing 110. The projection lens 190 includes, for example, one or a plurality of optical lens combinations with refracting powers including various non-planar lens combinations of a biconcave lens, a biconvex lens, a concave-convex lens, a convex-concave lens, a plane-convex lens, and a plane-concave lens, for example. In an embodiment, the projection lens 190 may also include a planar optical lens. Herein, a form and a type of the projection lens 190 is not particularly limited in the present embodiment. The projection lens 190 is configured to project an image light beam (not shown) coming from the optical engine module 180 out of the projector 100a.

In short, a zoned cooling manner is adopted for the projector 100a provided by this embodiment. Herein, in the first heat dissipation region H1, after cold air (referring to the thick black arrow in FIG. 1) entering into the housing 110 through the first air entry 112 and the second air entry 114 passes through the first heat dissipation fin group 130a and the second heat dissipation fin group 140a connected to the heat generation assembly 150, the heated air is then discharged from the first air exit 113 of the housing 110 through the fan 120. In the second heat dissipation region H2, after cold air (referring to the thick black arrow in FIG. 1) making its entry through the third air entry 116 and the fourth air entry 118 cools the optical engine module 180 and the projection lens 190, the heated air is then discharged from the second air exit 115 of the housing 110 through the fan 170.

Further, a distributed cooling design is adopted for the heat dissipation fin groups provided by this embodiment. That is, the first heat dissipation fin group 130a and the second heat dissipation fin group 140a are arranged to be separated from each other, and in this way, an influence brought by a decrease in heat dissipation efficiency generated by an increase in boundary layer thickness when air passes through the heat dissipation fins may be significantly lowered. The first heat dissipation fin group 130a and the second heat dissipation fin group 140a may use cold air for cooling. The heated air passing through the first heat dissipation fin group 130a and the second heat dissipation fin group 140a may be directly taken away from the projector 100a through the fan 120, and thus downstream components are prevented from being heated, and the projector 100a may provide favorable heat dissipation efficiency. In addition, in the case that a blower fan is used as the fan 120, a static pressure may be increased and a flowing amount may be increased for component cooling compared to a conventional axial fan, and generation of noise may be reduced as well.

It should be noted that the reference numerals and a part of the contents in the previous embodiment are used in the following embodiments, in which identical reference numerals indicate identical or similar components, and repeated description of the same technical contents is omitted. Please refer to the descriptions of the previous embodiments for the omitted contents, which will not be repeated hereinafter.

Figure 2:
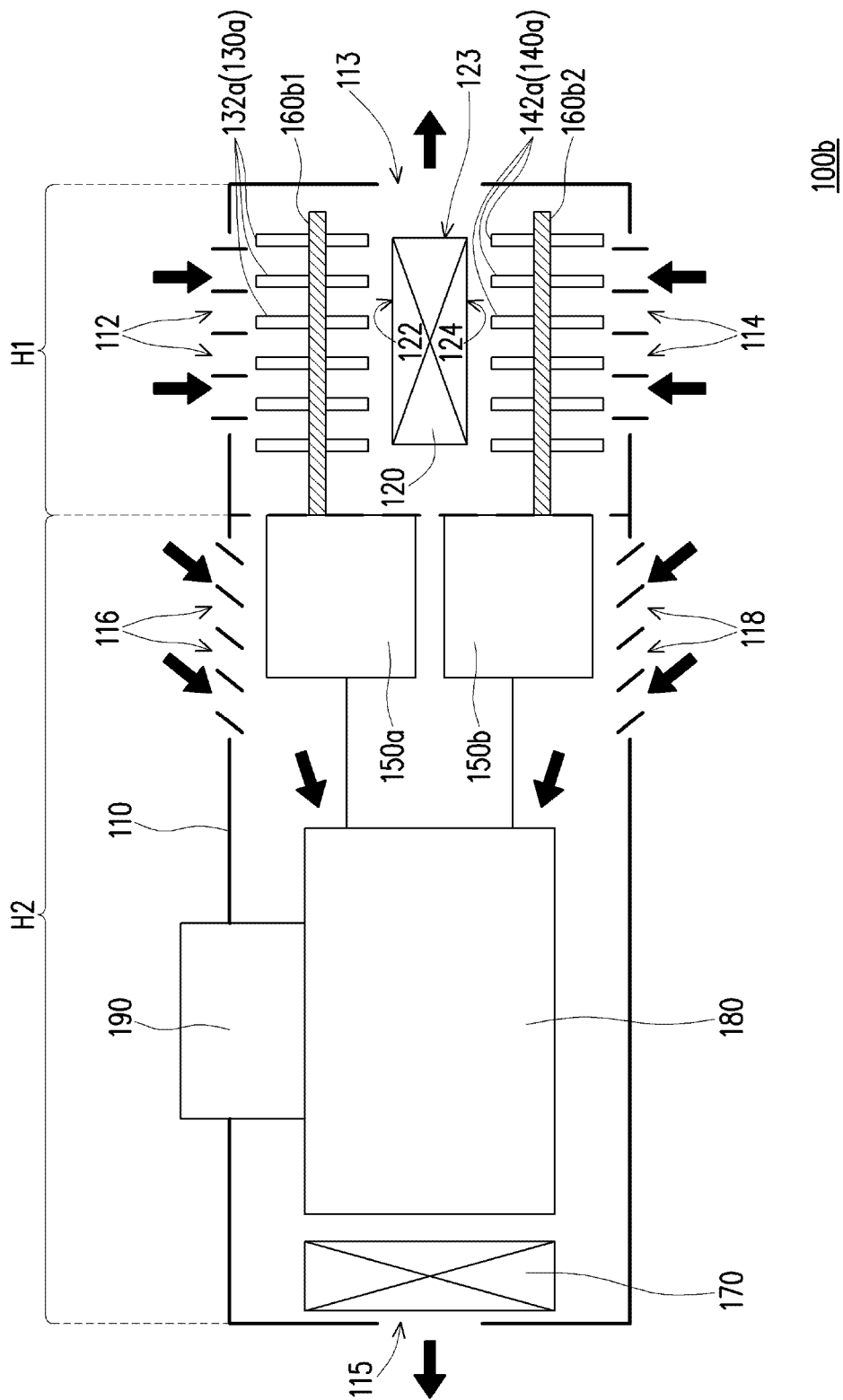
FIG. 2 is a schematic view of a projector according to another embodiment of the disclosure.

FIG. 2 is a schematic view of a projector according to another embodiment of the disclosure. With reference to FIG. 1 and FIG. 2 together, a projector 100b provided by this embodiment is similar to the projector 100a in FIG. 1, and a difference therebetween is that: a heat pipe assembly provided by this embodiment is different from the heat pipe assembly 160a in FIG. 1.

To be specific, the projector 100b provided by this embodiment includes a first heat pipe 160b1 and a second heat pipe 160b2 separated from each other. The first heat pipe 160b1 and the second heat pipe 160b2 are disposed in the first heat dissipation region H1 of the housing 110. The heat generation assembly located in the second heat dissipation region H2 includes a first heat generation assembly 150a and a second heat generation assembly 150b. The first heat pipe 160b1 is connected to the first heat dissipation fins 132a and the first heat generation assembly 150a. The second heat pipe 160b2 is connected to the second heat dissipation fins 142a and the second heat generation assembly 150b.

Since the fan 120 allows air to enter from two sides, cold air (referring to the thick black arrow in FIG. 1) entering the housing 110 from the first air entry 112 and the second air entry 114 may directly pass through the first heat dissipation fin group 130a connected to the first heat generation assembly 150a and the second heat dissipation fin group 140a connected to the second heat generation assembly 150b respectively. The heated air is then directly discharged from the air outlet 123 of the fan 120 and the first air exit 113 of the housing 110 in sequence. In this way, the heated air may be prevented from directly heating the downstream components, and that the projector 100b provided by this embodiment may therefore provide favorable heat dissipation efficiency.

Figure 3:
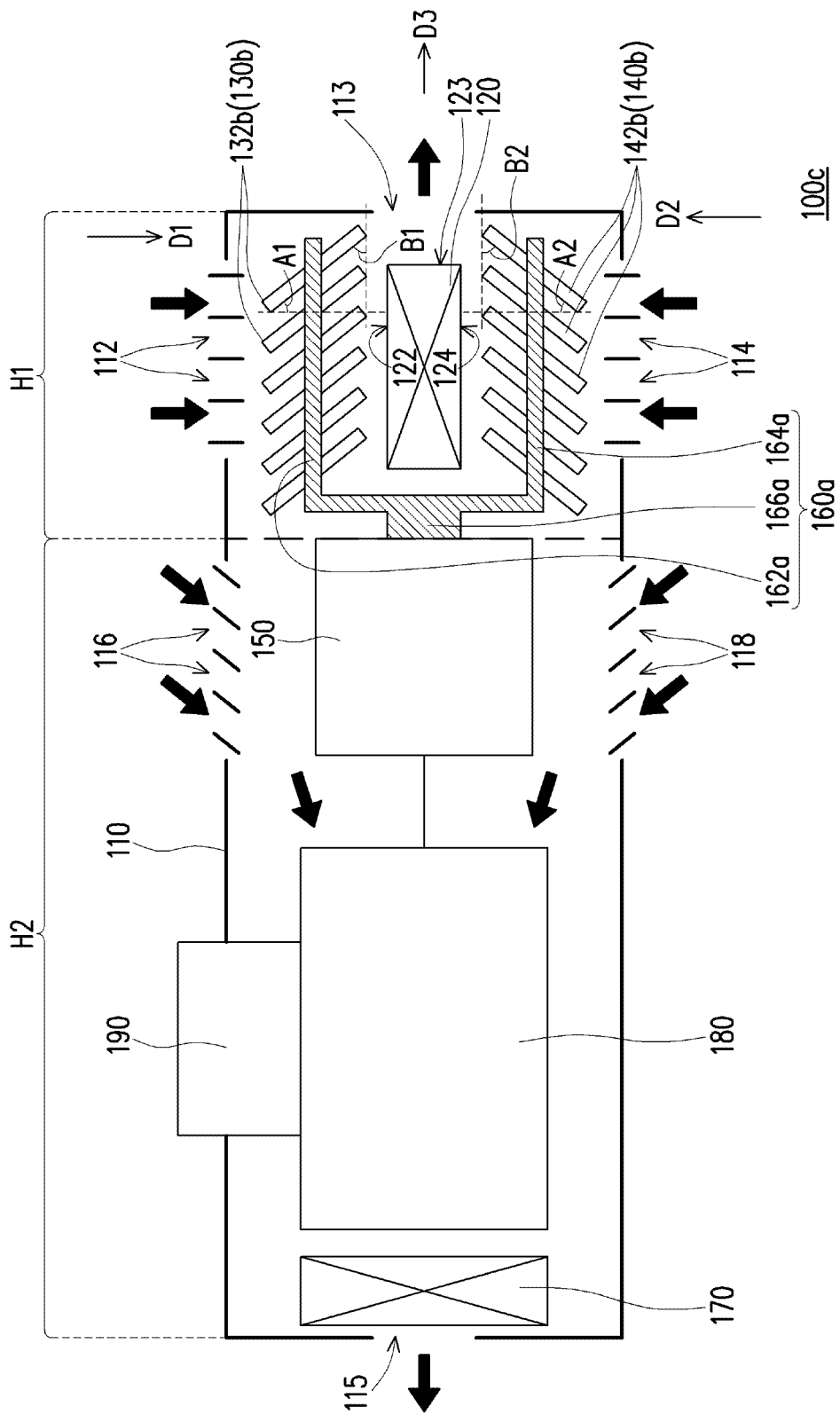
FIG. 3 is a schematic view of a projector according to another embodiment of the disclosure.

FIG. 3 is a schematic view of a projector according to another embodiment of the disclosure. With reference to FIG. 1 and FIG. 3 together, a projector 100c provided by this embodiment is similar to the projector 100a in FIG. 1, and a difference therebetween is that: arrangement of heat dissipation fins provided in this embodiment is different from the arrangement of the first heat dissipation fins 132a and the second heat dissipation fins 142a provided in FIG. 1.

To be specific, a first included angle A1 is provided between each first heat dissipation fin 132b of a first heat dissipation fin group 130b and the first air entry direction D1 of the first air entry 112 in this embodiment. A first included angle A2 is provided between each second heat dissipation fin 142b of a second heat dissipation fin group 140b and the second air entry direction D2 of the second air entry 114 in this embodiment. Preferably, the first included angle A1 and the second included angle A2 are both greater than 0 and less than or equal to 60 degrees. That is, each first heat dissipation fin 132b is neither perpendicular nor parallel to the first air entry direction D1 of the first air entry 112, and each second heat dissipation fin 142b is neither perpendicular nor parallel to the second air entry direction D2 of the second air entry 114.

Further, a first included angle B1 and a second included angle B2 are respectively provided between each first heat dissipation fin 132b as well as each second heat dissipation fin 142b and an air outlet direction D3 of the air outlet 123 of the fan 120 in this embodiment. Preferably, the first included angle B1 and the second included angle B2 are both greater than 0 and less than or equal to 60 degrees.

Since the fan 120 allows air to enter from two sides, cold air (referring to the thick black arrow in FIG. 3) entering the housing 110 from the first air entry 112 and the second air entry 114 may be allowed to directly pass through the first heat dissipation fin group 130b and the second heat dissipation fin group 140b connected to the heat generation assembly 150 respectively. The heated air is then directly discharged from the air outlet 123 of the fan 120 and the first air exit 113 of the housing 110 in sequence. In this way, the heated air may be prevented from directly heating the downstream components, and that the projector 100c provided by this embodiment may therefore provide favorable heat dissipation efficiency.

Figure 4:
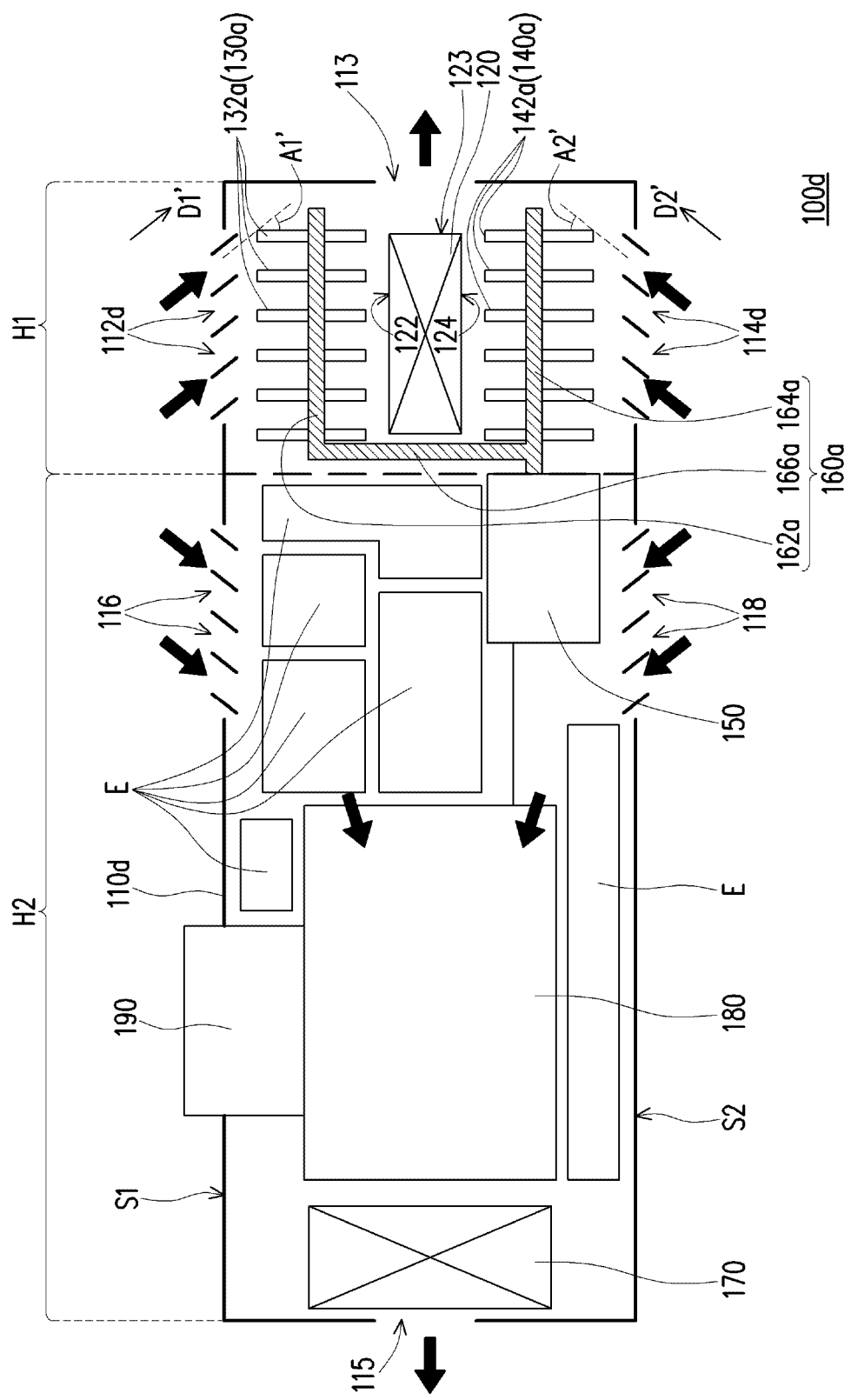
FIG. 4 is a schematic view of a projector according to another embodiment of the disclosure.

FIG. 4 is a schematic view of a projector according to another embodiment of the disclosure. With reference to FIG. 1 and FIG. 4 together, a projector 100d provided by this embodiment is similar to the projector 100a in FIG. 1, and a difference therebetween is that: in this embodiment, a first air entry direction D1' of a first air entry 112d of a housing 110d is inclined with respect to the first side S1, and a second air entry direction D2' of a second air entry 114d is inclined with respect to the second side S2. A first included angle A1' is provided between the first heat dissipation fins 132a and the first air entry direction D1' of the first air entry 112d, and a second included angle A2' is provided between the second heat dissipation fins 142a and the second air entry direction D2' of the second air entry 114d. Preferably, the first included angle A1' and the second included angle A2' are both greater than 0 and less than or equal to 60 degrees. Besides, the projector 100d provided by this embodiment further includes a plurality of electronic assemblies E. The plurality of electronic assemblies E are disposed in the second heat dissipation region H2 of the housing 110d and is adjacent to the third air entry 116 and the fourth air entry 118.

In the first heat dissipation region H1, since the fan 120 allows air to enter from two sides, cold air (referring to the thick black arrow in FIG. 4) entering the housing 110d from the first air entry 112d and the second air entry 114d may be allowed to directly pass through the first heat dissipation fin group 130a and the second heat dissipation fin group 140a connected to the heat generation assembly 150 respectively. The heated air is then directly discharged from the air outlet 123 of the fan 120 and the first air exit 113 of the housing 110d in sequence. In the second heat dissipation region H2, cold air (referring to the thick black arrow in FIG. 4) making its entry through the third air entry 116 and the fourth air entry 118 may cool the electronic assemblies E, the optical engine module 180, and the projection lens 190. The heated air is then discharged from the second air exit 115 of the housing 110d through the system fan 170. In this way, the heated air may be prevented from directly heating the downstream components, and that the projector 100d provided by this embodiment may therefore provide favorable heat dissipation efficiency.

Figure 5:
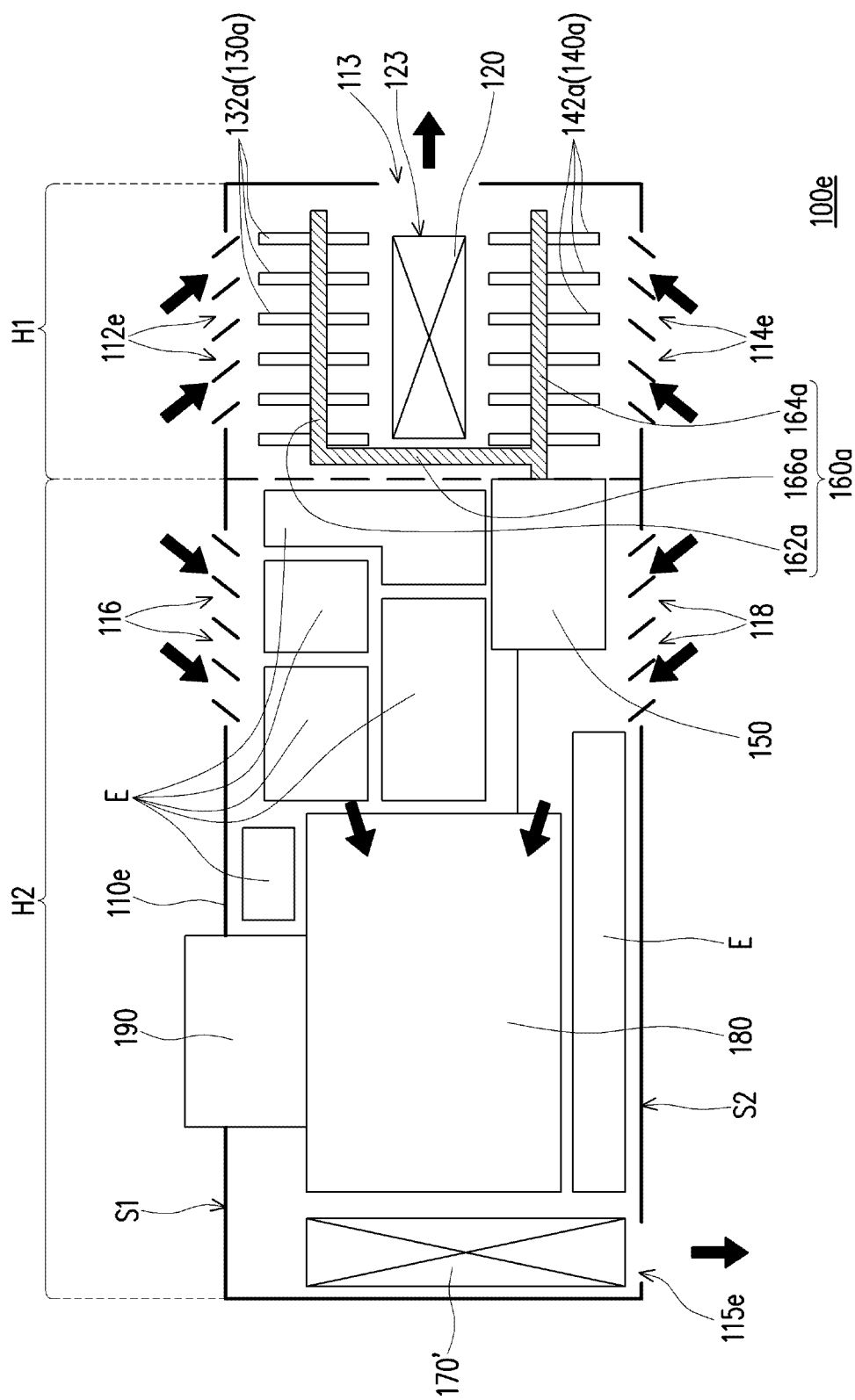
FIG. 5 is a schematic view of a projector according to another embodiment of the disclosure.

FIG. 5 is a schematic view of a projector according to another embodiment of the disclosure. With reference to FIG. 4 and FIG. 5 together, a projector 100e provided by this embodiment is similar to the projector 100a in FIG. 4, and a difference therebetween is that: in this embodiment, the first air entry direction D1' of a first air entry 112e of a housing 110e is inclined with respect to the first side S1, the second air entry direction D2' of a second air entry 114e is inclined with respect to the second side S2, and a second air exit 115e is located at the second side S2 of the housing 110e. A system fan 170' is disposed in the second heat dissipation region H2 and is disposed corresponding to the second air exit 115e, and the system fan 170' is a blower fan. That is, the system fan 170' and the fan 120 disposed in the first heat dissipation region H1 are both blower fans. An air outlet (not shown) of the system fan 170' is disposed corresponding to the second air exit 115e.

Figure 6:
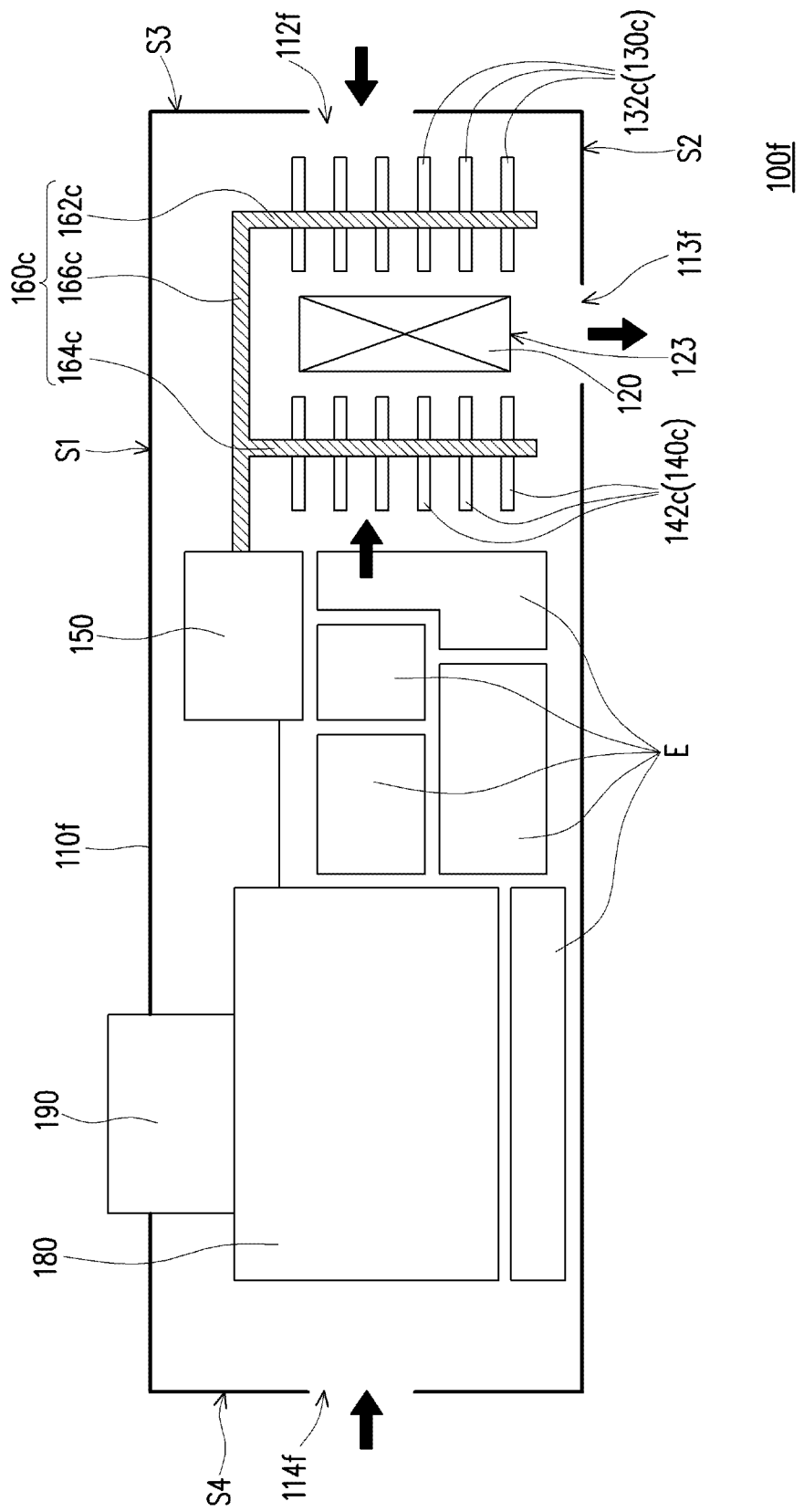
FIG. 6 is a schematic view of a projector according to another embodiment of the disclosure.

FIG. 6 is a schematic view of a projector according to another embodiment of the disclosure. With reference to FIG. 1 and FIG. 6 together, a projector 100f provided by this embodiment is similar to the projector 100a in FIG. 1, and a difference therebetween is that: a housing 110f provided by this embodiment has only one heat dissipation region, a first air entry 112f of the housing 110f is located at the third side S3, a second air entry 114f of the housing 110f is located at the fourth side S4, and a first air exit 113f is located at the second side S2 of the housing 110f. Further, a first heat pipe portion 162c of a heat pipe assembly 160c is connected to first heat dissipation fins 132c of a first heat dissipation fin group 130c and a connection portion 166c. A second heat pipe portion 164c of the heat pipe assembly 160c is connected to second heat dissipation fins 142c of a second heat dissipation fin group 140c and the connection portion 166c. Further, the connection portion 166c of the heat pipe assembly 160c is connected to the heat generation assembly 150, the first heat pipe portion 162c, and the second heat pipe portion 164c. In addition, the projector 100f further includes the electronic assemblies E. The plurality of electronic assemblies E are disposed in the housing 110 and are located between the second air entry 114f of the housing 110f and the second heat dissipation fin group 140c.

Since the fan 120 allows air to enter from two sides, air (referring to the thick black arrow in FIG. 6) entering the housing 110f from the first air entry 112f and the second air entry 114f may be allowed to directly pass through the first heat dissipation fin group 130c and the second heat dissipation fin group 140c connected to the heat generation assembly 150 respectively. The heated air is then directly discharged from the air outlet 123 of the fan 120 and the first air exit 113f of the housing 110f. Further, the air (referring to the thick black arrow in FIG. 6) entering from the second air entry 114f may perform heat dissipation on the optical engine module 180, the projection lens 190, and the electronic assemblies E first, passes through the second heat dissipation fin group 140c next, and is then directly discharged from the air outlet 123 of the fan 120 and the first air exit 113f of the housing 110f in sequence. In this way, the heated air may be prevented from directly heating the downstream components, and that the projector 100f provided by this embodiment may therefore provide favorable heat dissipation efficiency.

Figure 7:
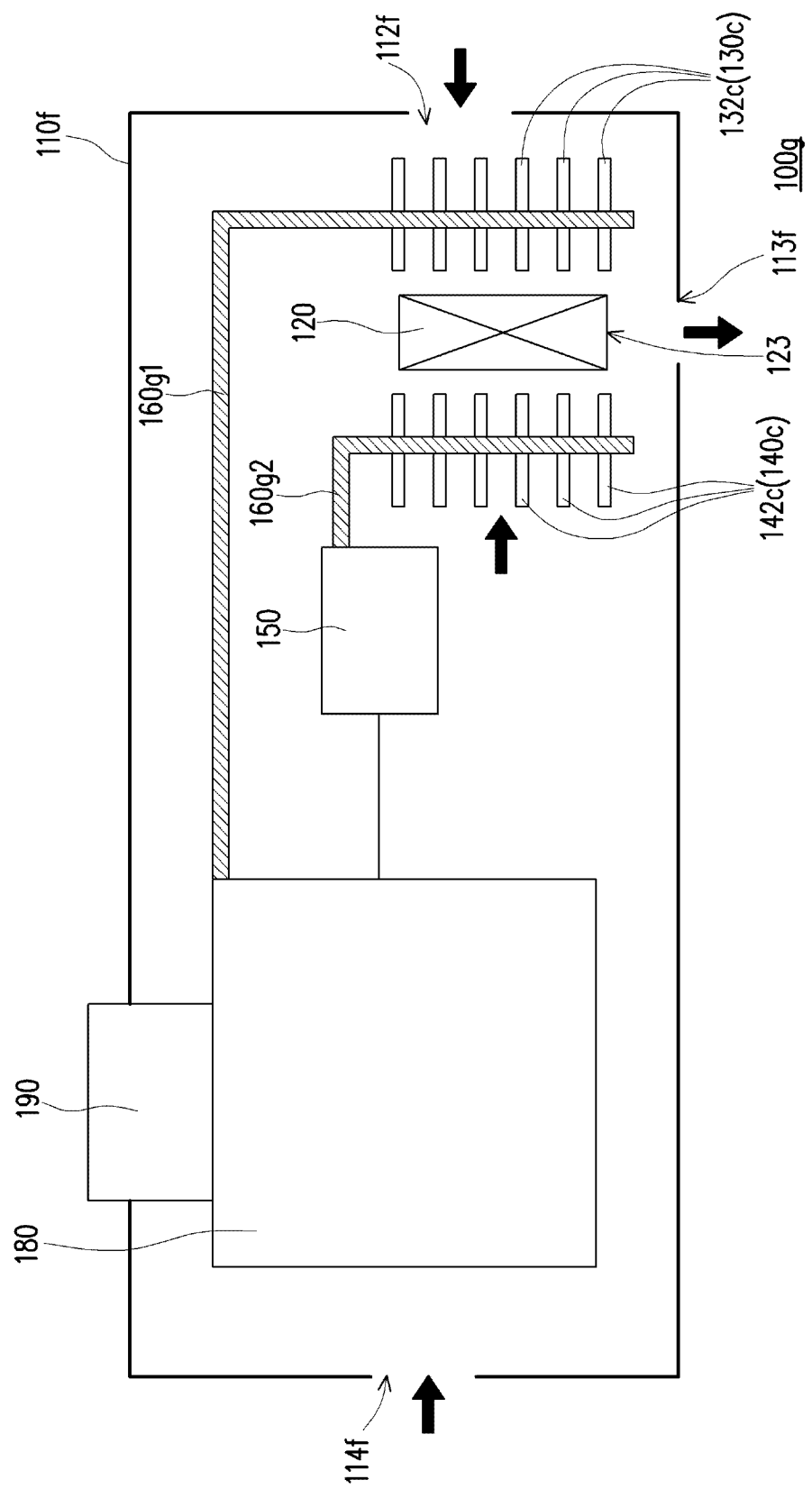
FIG. 7 is a schematic view of a projector according to another embodiment of the disclosure.

FIG. 7 is a schematic view of a projector according to another embodiment of the disclosure. With reference to FIG. 6 and FIG. 7 together, a projector 100g provided by this embodiment is similar to the projector 100f in FIG. 6, and a difference therebetween is that: a heat pipe assembly provided by this embodiment is different from the heat pipe assembly 160c in FIG. 6, and the electronic assemblies E shown in FIG. 6 are not provided in this embodiment.

To be specific, the projector 100g provided by this embodiment includes a first heat pipe 160g1 and a second heat pipe 160g2 separated from each other. The first heat pipe 160g1 is connected to the first heat dissipation fins 132c and the optical engine module 180. The second heat pipe 160g2 is connected to the second heat dissipation fins 142c and the heat generation assembly 150. Since the fan 120 allows air to enter from two sides, air (referring to the thick black arrow in FIG. 7) entering the housing 110f from the first air entry 112f and the second air entry 114f may be allowed to directly pass through the optical engine module 180 and the first heat dissipation fin group 130c and the second heat dissipation fin group 140c of the heat generation assembly 150 respectively. The heated air is then directly discharged from the air outlet 123 of the fan 120 and the first air exit 113f of the housing 110f in sequence. Further, the air (referring to the thick black arrow in FIG. 7) entering from the second air entry 114f may perform heat dissipation on the optical engine module 180 and the projection lens 190 first, passes through the second heat dissipation fin group 140c next, and is then directly discharged from the air outlet 123 of the fan 120 and the first air exit 113f of the housing 110f in sequence. In this way, the heated air may be prevented from directly heating the downstream components, and that the projector 100g provided by this embodiment may therefore provide favorable heat dissipation efficiency.

Figure 8:
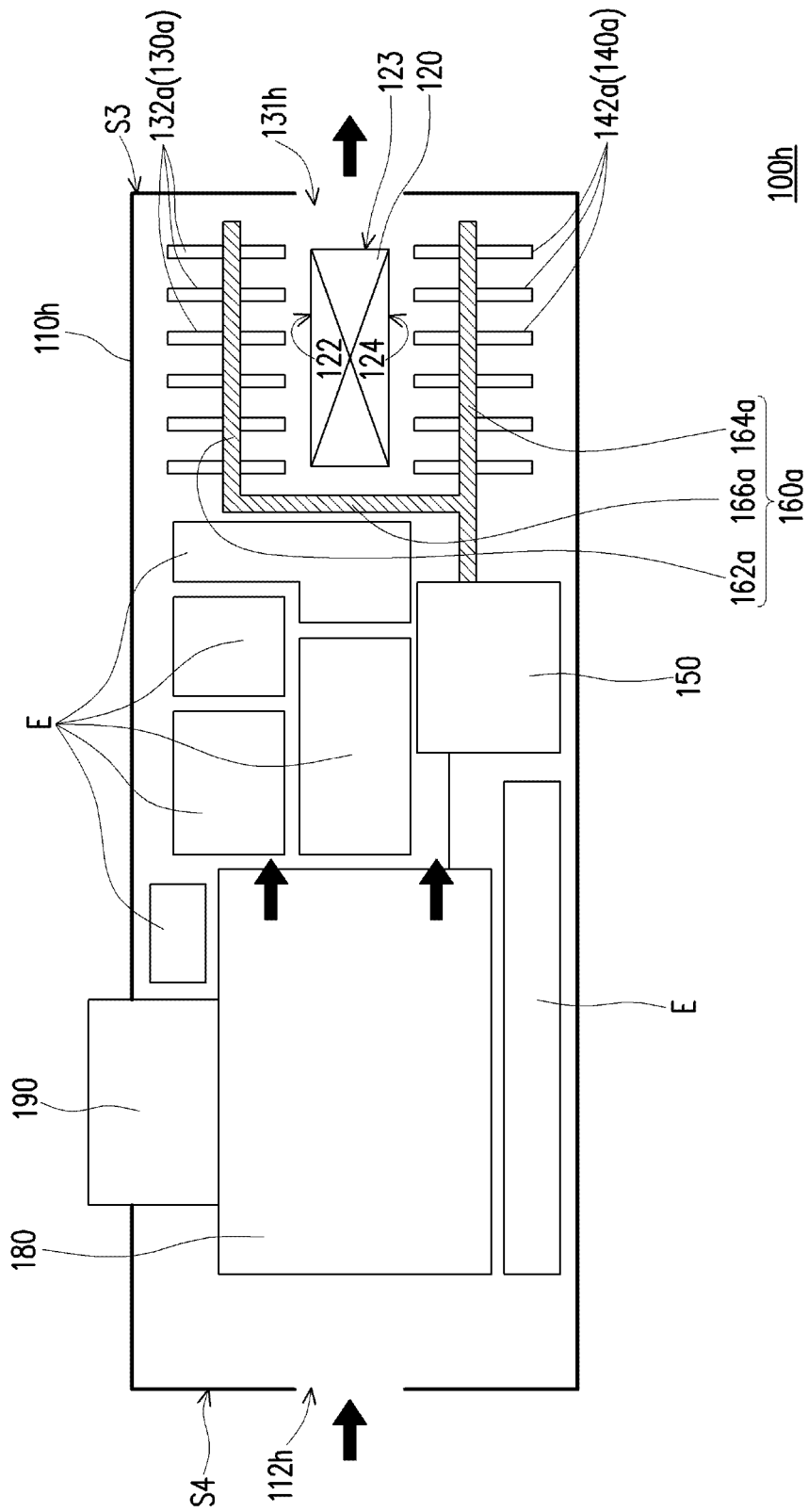
FIG. 8 is a schematic view of a projector according to another embodiment of the disclosure.

FIG. 8 is a schematic view of a projector according to another embodiment of the disclosure. With reference to FIG. 6 and FIG. 8 together, a projector 100h provided by this embodiment is similar to the projector 100f in FIG. 6, and a difference therebetween is that: a housing 110h provided by this embodiment has one air entry 112h and one air exit 113h, where the air entry 112h is disposed at the fourth side S4 of the housing 110h, and the air exit 113h is disposed at the third side S3 of the housing 110. This projection system is, for example, a high impedance system. The air entry 112h is disposed at the fourth side S4 only, and an air flow entering from the air entry 112h of the housing 110h is driven by the fan 120 (i.e., a blower fan) and is discharged from the air exit 113h at the third side S3 of the housing 110h. As the fan 120 (i.e., a blower fan) allowing air to enter from two sides is disposed between the first heat dissipation fin group 130a and the second heat dissipation fin group 140a, a high static pressure is provided for the high impedance system, and a high flowing amount is provided in the high impedance system for component cooling.

In view of the foregoing, the embodiments of the disclosure have at least one of the following advantages or effects. In the projector provided by the disclosure, the fan is located between the first heat dissipation fin group and the second heat dissipation fin group. The first heat dissipation fin group is located between the first air entry of the housing and the first air inlet of the fan, and the second heat dissipation fin group is located between the second air entry of the housing and the second air inlet of the fan. Moreover, the heat generation assembly is connected to the first heat dissipation fin group and the second heat dissipation fin group. Accordingly, as the fan allows air to enter from two sides, cold air may directly pass through the first heat dissipation fin group and the second heat dissipation fin group. The heated air is then directly discharged from the air outlet of the fan. In this way, heat dissipation is performed on the heat generation assembly, the heated air may also be prevented from directly heating the downstream components, and that the projector may therefore provide favorable heat dissipation efficiency.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A projector, comprising a housing, a fan, a first heat dissipation fin group, a second heat dissipation fin group, and at least one heat generation assembly, wherein
    the housing comprises a first air entry, a second air entry, and a first air exit,
    the fan, the first heat dissipation fin group, the second heat dissipation fin group, and the at least one heat generation assembly are disposed in the housing,
    the fan is located between the first heat dissipation fin group and the second heat dissipation fin group and includes a first air inlet, a second air inlet, and an air outlet, the air outlet is disposed corresponding to the first air exit of the housing,
    the first heat dissipation fin group is located between the first air entry and the first air inlet, the second heat dissipation fin group is located between the second air entry and the second air inlet, and the at least one heat generation assembly is connected to the first heat dissipation fin group and the second heat dissipation fin group.

2. The projector according to claim 1, wherein the first heat dissipation fin group comprises a plurality of first heat dissipation fins disposed at intervals, the second heat dissipation fin group comprises a plurality of second heat dissipation fins disposed at intervals, and the first heat dissipation fins and the second heat dissipation fins are arranged at intervals in an arrangement direction.

3. The projector according to claim 2, wherein a first width of each of the first heat dissipation fins in a first air entry direction of the first air entry is less than or equal to 100 millimeters, and a second width of each of the second heat dissipation fins in a second air entry direction of the second air entry is less than or equal to 100 millimeters.

4. The projector according to claim 3, wherein the first width and the second width are identical or are different.

5. The projector according to claim 3, wherein the housing is divided into a first heat dissipation region and a second heat dissipation region, the at least one heat generation assembly is located in the second heat dissipation region, the first heat dissipation fin group, the second heat dissipation fin group, and the fan are located in the first heat dissipation region, and the first air exit of the housing is disposed in the first heat dissipation region.

6. The projector according to claim 5, wherein the housing has a first side and a second side opposite to each other and a third side and a fourth side connected to the first side and the second side and opposite to each other, the housing further comprises a third air entry, a fourth air entry, and a second air exit, the third air entry, the fourth air entry, and the second air exit are disposed in the second heat dissipation region, the first air entry and the second air entry are disposed in the first heat dissipation region, the first air entry and the third air entry are located at the first side, the second air entry and the fourth air entry are located at the second side, the first air exit is located at the third side, and the second air exit is located at the second side or the fourth side.

7. The projector according to claim 6, wherein the first air entry direction of the first air entry and the second air entry direction of the second air entry are respectively perpendicular to the arrangement direction of the first heat dissipation fins and the second heat dissipation fins.

8. The projector according to claim 6, wherein a first included angle is provided between the first heat dissipation fins and the first air entry direction of the first air entry, a second included angle is provided between the second heat dissipation fins and the second air entry direction of the second air entry, and the first included angle and the second included angle are both greater than 0 and less than or equal to 60 degrees.

9. The projector according to claim 6, wherein a first included angle and a second included angle are respectively provided between the first heat dissipation fins and the second heat dissipation fins in an air outlet direction of the air outlet, and the first included angle and the second included angle are both greater than 0 and less than or equal to 60 degrees.

10. The projector according to claim 6, further comprising:
a heat pipe assembly, disposed in the first heat dissipation region of the housing, comprising a first heat pipe portion, a second heat pipe portion, and a connection portion, wherein the first heat pipe portion is connected to the plurality of first heat dissipation fins and the connection portion, the second heat pipe portion is connected to the plurality of second heat dissipation fins and the connection portion, a number of the at least one heat generation assembly is one, and the connection portion is connected to the heat generation assembly, the first heat pipe portion, and the second heat pipe portion.

11. The projector according to claim 6, further comprising:
a first heat pipe and a second heat pipe, disposed in the first heat dissipation region of the housing, wherein the at least one heat generation assembly comprises a first heat generation assembly and a second heat generation assembly, the first heat pipe is connected to the plurality of first heat dissipation fins and the first heat generation assembly, and the second heat pipe is connected to the plurality of second heat dissipation fins and the second heat generation assembly.

12. The projector according to claim 6, further comprising:
a system fan, disposed in the second heat dissipation region, disposed corresponding to the second air exit, wherein the second air exit is located at the fourth side, the system fan is an axial fan, and the fan disposed in the first heat dissipation region is a blower fan.

13. The projector according to claim 6, further comprising:
a system fan, disposed in the second heat dissipation region, disposed corresponding to the second air exit, wherein the second air exit is located at the second side, and the system fan and the fan disposed in the first heat dissipation region are both blower fans.

14. The projector according to claim 6, further comprising:
a plurality of electronic assemblies, disposed in the second heat dissipation region of the housing, adjacent to the third air entry and the fourth air entry.

15. The projector according to claim 2, wherein the housing has a first side and a second side opposite to each other and a third side and a fourth side connected to the first side and the second side and opposite to each other, the first air entry is located at the third side, the second air entry is located at the fourth side, and the first air exit is located at the second side.

16. The projector according to claim 15, further comprising:
a heat pipe assembly, disposed in the housing, comprising a first heat pipe portion, a second heat pipe portion, and a connection portion, wherein the first heat pipe portion is connected to the plurality of first heat dissipation fins and the connection portion, the second heat pipe portion is connected to the plurality of second heat dissipation fins and the connection portion, a number of the at least one heat generation assembly is one, and the connection portion is connected to the heat generation assembly, the first heat pipe portion, and the second heat pipe portion.

17. The projector according to claim 15, further comprising:
a plurality of electronic assemblies, disposed in the housing, located between the second air entry and the second heat dissipation fins.

18. The projector according to claim 17, further comprising:
an optical engine module, disposed in the housing;
a projection lens, connected to the optical engine module, extending outside the housing; and a first heat pipe and a second heat pipe, disposed in the housing, wherein a number of the at least one heat generation assembly is one, the first heat pipe is connected to the plurality of first heat dissipation fins and the optical engine module, and the second heat pipe is connected to the second heat dissipation fins and the heat generation assembly.

19. The projector according to claim 16, wherein the fan comprises a blower fan.

20. The projector according to claim 1, wherein the housing is divided into a first heat dissipation region and a second heat dissipation region, the first heat dissipation fin group, the second heat dissipation fin group, and the fan are located in the first heat dissipation region, the first air exit of the housing is disposed in the first heat dissipation region, the projector further comprises an optical engine module and a projection lens, the optical engine module and the projection lens are disposed in the second heat dissipation region of the housing, and the projection lens is connected to the optical engine module and extends outside the housing.

* * * * *